United States Patent
Winkelhake et al.

(10) Patent No.: US 7,913,518 B2
(45) Date of Patent: Mar. 29, 2011

(54) PROCESS AND DEVICE FOR PUSHING HOLLOW GLASS OBJECTS FROM A GLASS FORMING MACHINE ONTO A CONVEYOR BELT

(75) Inventors: Dirk Winkelhake, Nienstädt (DE); Hermann Bögert, Auetal (DE); Siegfried Schwarzer, Stöckse (DE); Michael Hoffmann, Meerbeck (DE)

(73) Assignee: Heye International GmbH, Obernkirchen (DE)

( * ) Notice: Subject to any disclaimer, the term of this patent is extended or adjusted under 35 U.S.C. 154(b) by 445 days.

(21) Appl. No.: 11/068,130

(22) Filed: Feb. 28, 2005

(65) Prior Publication Data

US 2005/0193773 A1    Sep. 8, 2005

(30) Foreign Application Priority Data

Mar. 3, 2004    (DE) .................. 10 2004 010 238

(51) Int. Cl.
*C03B 9/04*    (2006.01)
*C03B 9/44*    (2006.01)

(52) U.S. Cl. ............... 65/260; 196/370.01; 196/377.01; 196/434

(58) Field of Classification Search .............. 65/165, 65/260, 239, 241; 198/370.01–370.07, 375, 198/377.01, 377.06, 377.1, 394, 418, 431
See application file for complete search history.

(56) References Cited

U.S. PATENT DOCUMENTS

| | | | |
|---|---|---|---|
| 3,595,365 A * | 7/1971 | Faure | 198/468.01 |
| 4,203,752 A | 5/1980 | Becker et al. | 65/163 |
| 5,037,466 A * | 8/1991 | Voisine et al. | 65/260 |
| 5,061,309 A * | 10/1991 | Mungovan et al. | 65/260 |
| 5,429,651 A * | 7/1995 | Bolin | 65/241 |
| 5,501,316 A * | 3/1996 | Hermening et al. | 198/457.03 |
| 5,846,283 A * | 12/1998 | Struckmeier et al. | 65/165 |

FOREIGN PATENT DOCUMENTS

| | | |
|---|---|---|
| CZ | 288 848 | 10/1996 |
| CZ | 288848 | * 10/1996 |
| DE | 198 00 080 C 1 | 1/1998 |
| WO | WO 2005/085145 A1 | 9/2005 |

OTHER PUBLICATIONS

English Translation of Jandik (CZ 288848) as translated by: The McElroy Translation Company, 2009.*
International Search Report, issued Nov. 30, 2005.

* cited by examiner

*Primary Examiner* — Jason L Lazorcik
*Assistant Examiner* — Jodi Cohen
(74) *Attorney, Agent, or Firm* — Fox Rothschild LLP

(57) ABSTRACT

A process and a device for pushing hollow glass objects off a glass forming machine onto a moving conveyor belt are disclosed. Each hollow glass object is pushed by a push-off unit from a dead plate along a curved path onto the conveyor belt in such a way that the curved path is brought tangentially to a contact point in a movement direction of the conveyor belt. Subsequent to the contact point each hollow glass object is pushed further by the push-off unit by a further linear path portion in the movement direction of the conveyor belt as far as a release point at which the push-off unit is released from the hollow glass object. The push-off unit is then moved back to dead plate.

9 Claims, 15 Drawing Sheets

PROCESS AND DEVICE FOR PUSHING HOLLOW GLASS OBJECTS FROM A GLASS FORMING MACHINE ONTO A CONVEYOR BELT

FIELD OF THE INVENTION

The invention relates firstly to an I.S. (individual section) glass forming machines, and more particularly to a process for pushing at least one hollow glass object from a dead plate of each section of an individual section glass forming machine onto a conveyor belt for pushing at least one hollow glass object from a dead plate of each section of an I.S. glass forming machine onto a conveyor belt which is common to all sections of the I.S. glass forming machine.

BACKGROUND OF THE INVENTION

In a known process of this type (disclosed in U.S. Pat. No. 4,203,752 A) the curved path is formed substantially by a quarter circle. The hollow glass objects can therefore readily be pushed from the dead plate onto the conveyor belt at up to the average speeds of the conveyor belt of up to about 60 m/min. However, it has proved to be the case that at relatively high conveyor belt speeds the hollow glass vessels are increasingly more difficult to push off and to position in a row on the conveyor belt.

In order to solve this problem it has already been proposed (in DE 198 00 080 C1) to dispose the push-off unit together with its pivot drive on a support of the push-off device and to move this support in a linear and reciprocating manner in each push-off cycle by means of a linear drive at least approximately in parallel with the movement direction of the conveyor belt. In this way a curved path deviating from the circular path was provided for the push-off unit. However, this proposal was associated with high constructional cost and space requirements.

From U.S. Pat. No. 5,429,651 A it is known per se to set down a plurality of hollow glass objects in a row on the dead plate, wherein this row forms an acute angle with the movement direction of the conveyor belt. The push-off unit is pivoted about a vertical axis in order to push the hollow glass objects off the dead plate onto the conveyor belt and is linearly displaced at the same time in the direction of the original row of vessels. This also leads to a considerable constructional cost and space requirement.

From CZ 288 848 B6 it is known per se to impart a pivoting reciprocating movement to the push-off unit by means of a first drive unit. Furthermore a second drive unit is provided, the driven shaft of which constantly circulates in the same direction and, by means of a parallelogram-like pair of cranks, imparts to the push-off unit its reciprocating radial movement in and out of contact with the hollow glass objects. This proposal is also not suitable for relatively high conveyor belt speeds. It is also associated with high constructional cost.

SUMMARY AND OBJECTS OF THE INVENTION

It is the object of the invention to push the hollow glass objects off the dead plate onto the conveyor belt and to transfer them to the conveyor belt safely even at relatively high conveyor belt speeds of e.g. more than 60 m/min.

The above object is achieved by pushing the glass objects onto the conveyor belt along a curved path that is brought tangentially to a contact point in a movement direction of the conveyor belt, where the objects are further pushed along a linear path in the movement direction of the conveyor belt as far as a release point. The curved path can be in the form of a circular arc or can deviate from the circular arc if necessary. By means of the linear path portion, adjoining the curved path, between the contact point and the release point the hollow glass objects are stabilized by the push-off unit and directed precisely in the movement direction of the conveyor belt. Only at the release point is the push-off unit removed from the hollow glass objects which have been pushed off and then moved back to its starting point on the dead plate.

The hollow glass objects are disposed aligned with each other in the movement direction at their respective contact points to facilitate ordered transfer of a plurality of hollow glass objects simultaneously produced in the section, to the conveyor belt.

The invention also relates to a device for pushing at least one hollow glass object from a dead plate of each section of an individual section glass forming machine onto a conveyor belt.

A device of this type is known from CZ 288 848 B6. However, using this device it is not possible subsequent to the curved path to impart to the push-off unit a linear movement in the movement direction of the conveyor belt. The push-off unit is supported by a pair of cranks disposed in a parallelogram-like manner. This design is constructionally expensive and takes up a relatively large amount of space in the push-off area.

The afore-mentioned object is achieved by a device having a push-off unit which has a base part and, for each hollow glass object to be pushed-off, has at least one pushing finger extending transversely from the base part. A first drive unit is disposed in a fixed manner on the machine. The first hollow shaft, which is mounted in a fixed manner on the machine, can be rotatably driven in a reciprocating manner about a first longitudinal axis via a first gear mechanism. A housing is connected to the first hollow shaft, wherein a second shaft, having a second longitudinal axis in parallel with the first longitudinal axis, is rotatably mounted on the housing. The second shaft can be rotatably driven by a third shaft via a second gear mechanism, the third shaft being rotatably mounted concentric to the first longitudinal axis inside the first hollow shaft. The third shaft passes through the first hollow shaft, and can be rotatably driven by a second drive unit, which is disposed in a fixed manner on the machine, via a third gear mechanism. A crank arm is connected to the second shaft, and on the crank arm the push-off unit is mounted so as to be able to pivot about a third longitudinal axis in parallel with the first and second longitudinal axis. The third shaft is formed as a third hollow shaft that is concentric to the first longitudinal axis inside the third hollow shaft. A fourth shaft passes through the third hollow shaft and is rotatably mounted. The fourth shaft can be rotatably driven by a third drive unit, which is disposed in a fixed manner on the machine, via a fourth gear mechanism. By means of the fourth shaft via a fifth gear mechanism, a fifth shaft, which is concentric to the second longitudinal axis, can be rotatably driven. The second shaft is formed as a second hollow shaft and the fifth shaft is rotatably mounted inside the second hollow shaft and passes through the second hollow shaft. A sixth shaft can be rotatably driven by the fifth shaft via a sixth gear mechanism. The sixth shaft is disposed coaxial to the third longitudinal axis and is rotatably mounted on the crank arm. The push-off unit is mounted on the sixth shaft.

With these particular kinematics it becomes possible freely to determine the form of the curvature of the curved path during the push-off action. By this means it is possible during the actual push-off process to keep to a minimum any disruptive transverse or centrifugal forces applied to the hollow glass objects which are to be pushed. At the end of the arcuate push-off process the hollow glass objects are finally pushed further by the push-off unit by a linear path portion in the movement direction of the conveyor belt. In this way the hollow glass objects are further stabilized and precisely directed in the movement direction of the conveyor belt. Only then is the push-off unit released from the hollow glass objects and moved back into its initial position on the dead plate.

Each drive unit has an electric servo motor that can be controlled independently of one another in a sensitive and pre-programmable manner. In this way it is possible to impart to each type of hollow glass objects which are to be pushed an individually tailored movement profile during the push-off action and until final discharge onto the conveyor belt.

The gear mechanisms can be formed as a toothed belt gear mechanism in a cost-effective and operationally reliable manner.

Each drive unit is attached to a component that is fixed to the machine in such a way as to be adjustable in longitudinal direction of the toothed belt so that the tension in the toothed belts can be adjusted to the optimum value in a simple and reliable manner.

It is advantageous that all drive units can be disposed in a stationary manner below the plane of the conveyor belt. This leads to there being no active electrical and electronic components in the hot region above the conveyor belt. The power supply to the drive units is thus also fixed in position, whereby possible problems caused by a moveable power supply are avoided. Furthermore, it has been possible to keep the conveyor belt freely accessible on the operator side. All moveable joints are revolute joints. The device is consequently very robust and is not prone to the affects of dirt. All distances to other components can be such that shards of broken hollow glass objects do not disrupt the operation of the device.

BRIEF DESCRIPTION OF THE DRAWINGS

These and further features and advantages of the invention are explained in more detail hereinunder with the aid of the exemplified embodiment illustrated in the drawings in which.

DETAILED DESCRIPTION OF THE INVENTION

Figure 1:
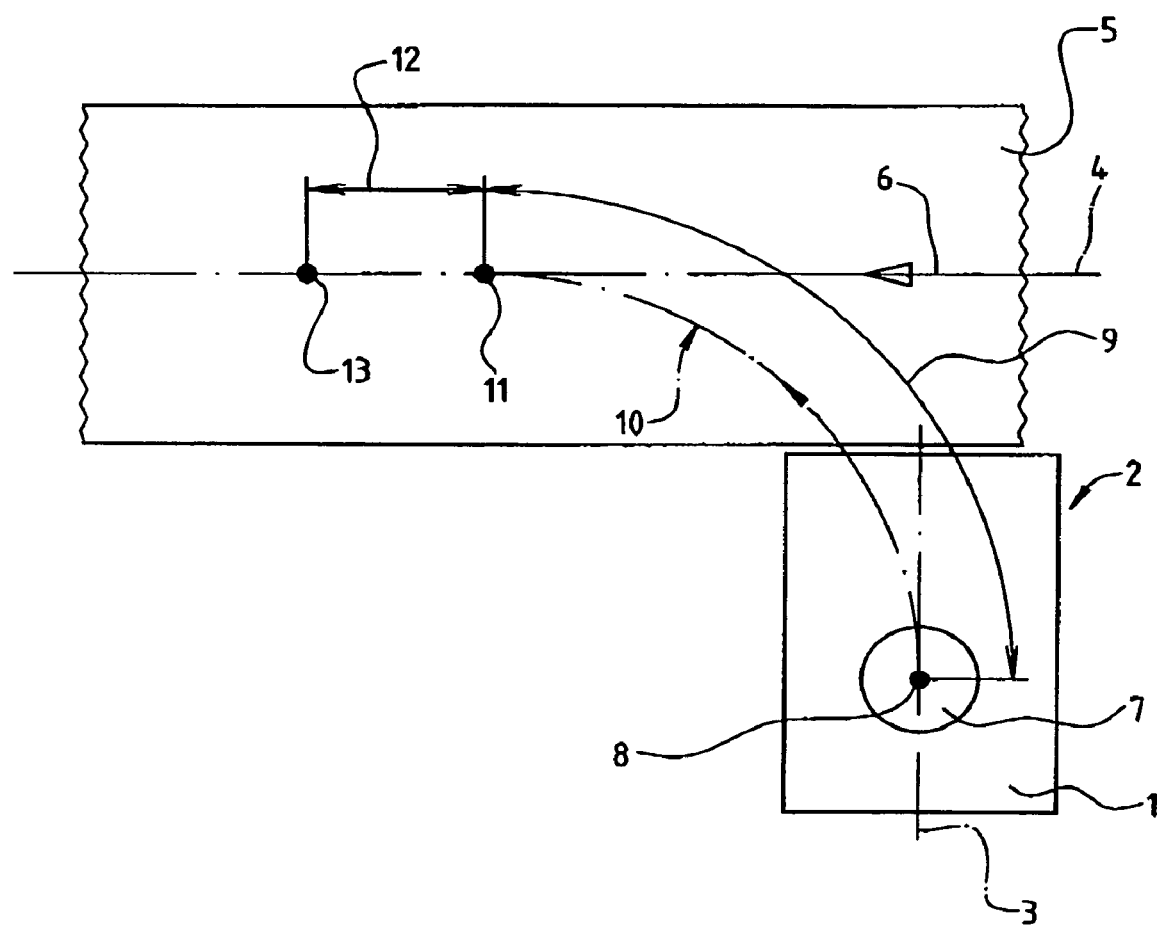
FIG. 1 is a schematic diagram of the push-off process.

FIG. 1 shows a stationary dead plate 1 of a section 2 of an I.S. (individual section) glass forming machine, not illustrated further. The dead plate 1 has a middle line 3 which extends at a right angle to a middle line 4 of a conveyor belt 5 common to all sections 2 of the glass forming machine. The conveyor belt 5 runs continually in a movement direction 6.

On the dead plate 1 at least one hollow glass object 7 produced in the section 2 is periodically set down. Each hollow glass object 7 is then positioned with its longitudinal axis in a starting point 8 where it is contacted by a push-off unit not shown in FIG. 1 and is pushed onto the conveyor belt 5 along a curved path 9 of a path curve 10 in such a way that the curved path 9 is brought tangentially to a contact point 11 in the movement direction 6 of the conveyor belt 5. Subsequent to the contact point 11 each hollow glass object 7 is pushed further by the push-off unit by a further linear path portion 12 of the path curve 10 in the movement direction 6 of the conveyor belt 5 as far as a release point 13 in which the push-off unit is released from the at least one hollow glass object 7. The push-off unit is then moved back in a manner that will be described later to the starting point 8 on the dead plate 1 in order to engage the next at least one hollow glass object 7 of the section 2.

In all the figures of the drawings like parts are provided with like reference numerals.

In FIGS. 2 to 15 a device 14 is illustrated with which the path curve 10 of the hollow glass objects 7 can be produced in accordance with FIG. 1.

Figure 2:
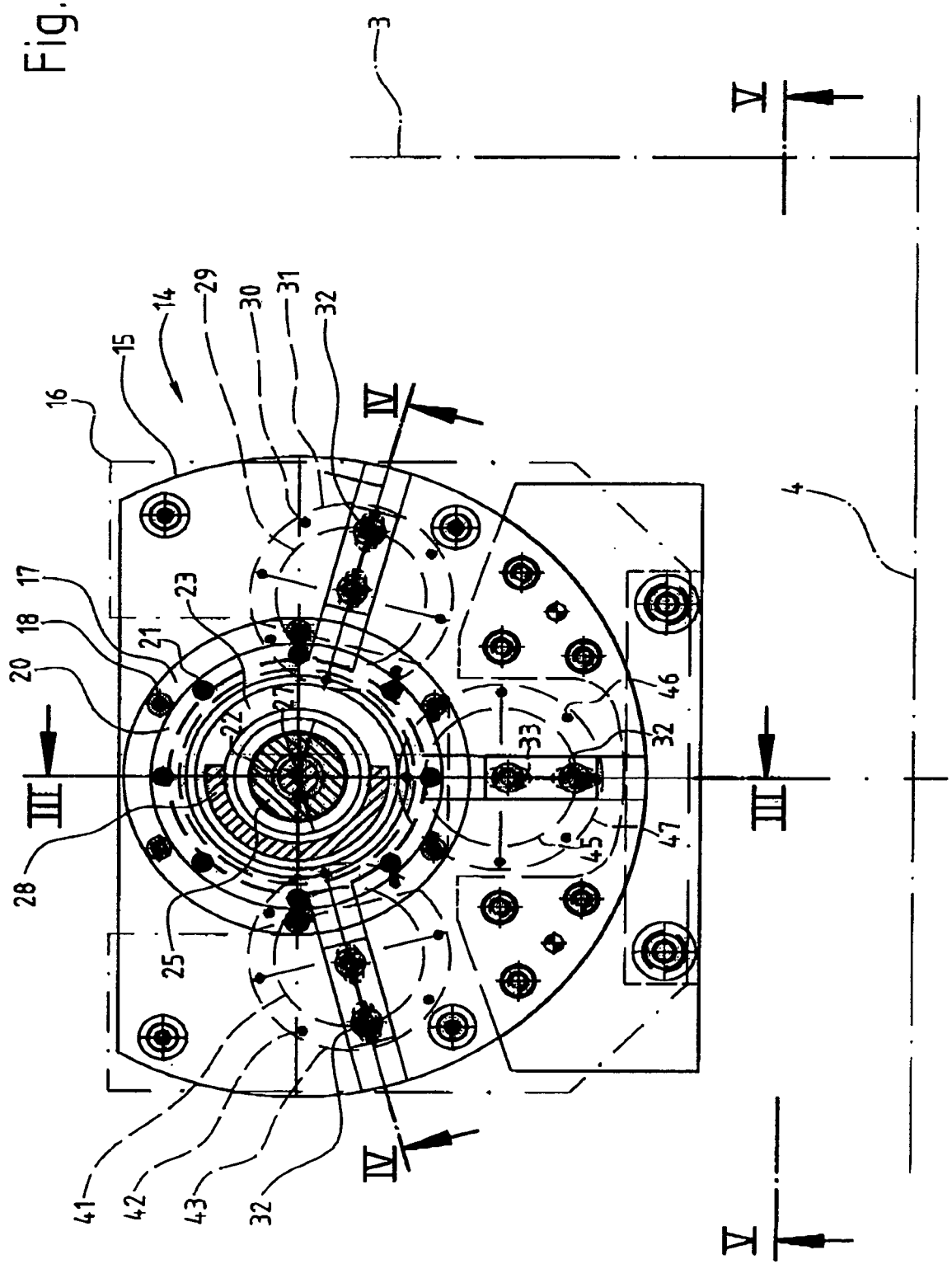
FIG. 2 illustrates substantially the cross-sectional view at line II-II of the device in accordance with FIG. 4.

In accordance with FIG. 2 the device 14 has a plate-like component 15 mounted in a fixed manner on the machine. Above the component 15 a horseshoe-like cover plate 16, shown only by a dot-dash line for the sake of better clarity, is disposed which is screwed to the component 15. A bearing bushing 17 is inserted into a central bore of the component 15 and is screwed to the component 15 by screws 18. In accordance with FIG. 4 two roller bearings 19 are inserted into the bearing bushing 17 and are secured at the top by a cover ring 20. In accordance with FIG. 2 the cover ring 20 is fixed by screws 21 to the bearing bushing 17.

Figure 4:
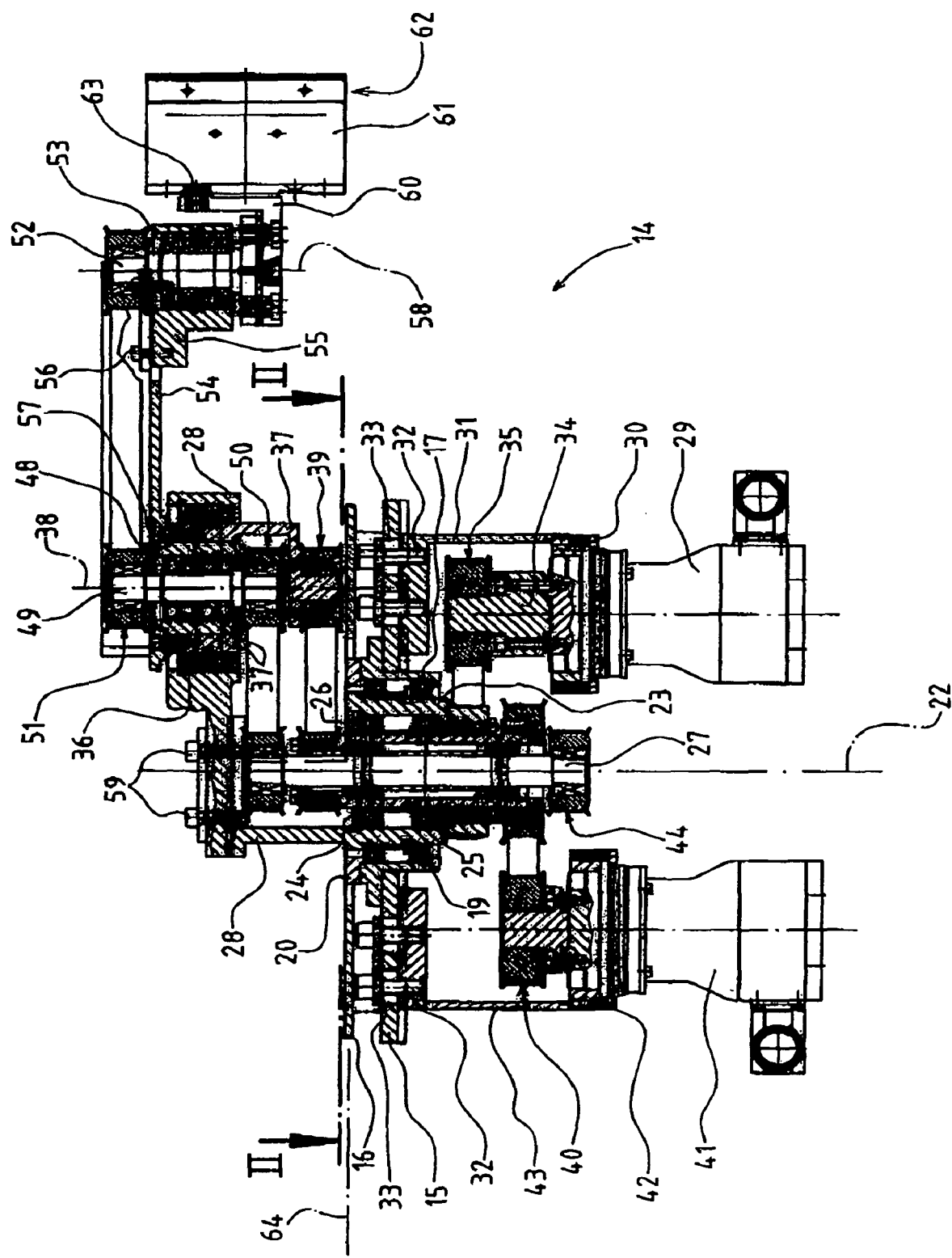
FIG. 4 illustrates the cross-sectional view at line IV-IV in FIG. 2.

From a combined view of FIGS. 2 and 4 it can be seen that a first hollow shaft 23 which can pivot about a first longitudinal axis 22 is pivotably mounted in both roller bearings 19. In the first hollow shaft 23 a third hollow shaft 25 is mounted by means of two roller bearings 24 so as to rotate about the first longitudinal axis 22. Finally, a fourth shaft 27 is rotatably mounted in the third hollow shaft 25 coaxially to the third hollow shaft 25 by means of four roller bearings 26.

The first hollow shaft 23 supports a housing 28 which extends upwards out of the cover plate 16.

A first drive unit 29 is fastened at the bottom to a first holding device by means of screws 30. The first holding device 31 is for its part tightened against an underside of the component 15 by two screws 32. Each screw 32 passes through an elongate hole 33 in the component 15 which extends in the direction of the first longitudinal axis 22. A driven shaft 34 of the first drive unit 29 is connected to the first hollow shaft 23 by means of a first gear mechanism 35 formed as a toothed belt gear mechanism.

A second hollow shaft 37 having a second longitudinal axis 38 in parallel with the first longitudinal axis 22 is rotatably mounted on the housing 28 by means of two roller bearings 36.

The second hollow shaft 37 has a lower protrusion which can be rotatably driven by the third hollow shaft 25 via a second gear mechanism 39 formed as a toothed belt gear mechanism. The third hollow shaft 25 is for its part rotatably driven by a second drive unit 41 via a third gear mechanism 40 formed as a toothed belt gear mechanism. The second drive unit 41 is attached at the bottom to a second holding device 43 by screws 42. The second holding device 43 is adjustably attached to the component 15 in the same way as the first holding device 31 via screws 32 and elongate holes 33.

Figure 3:
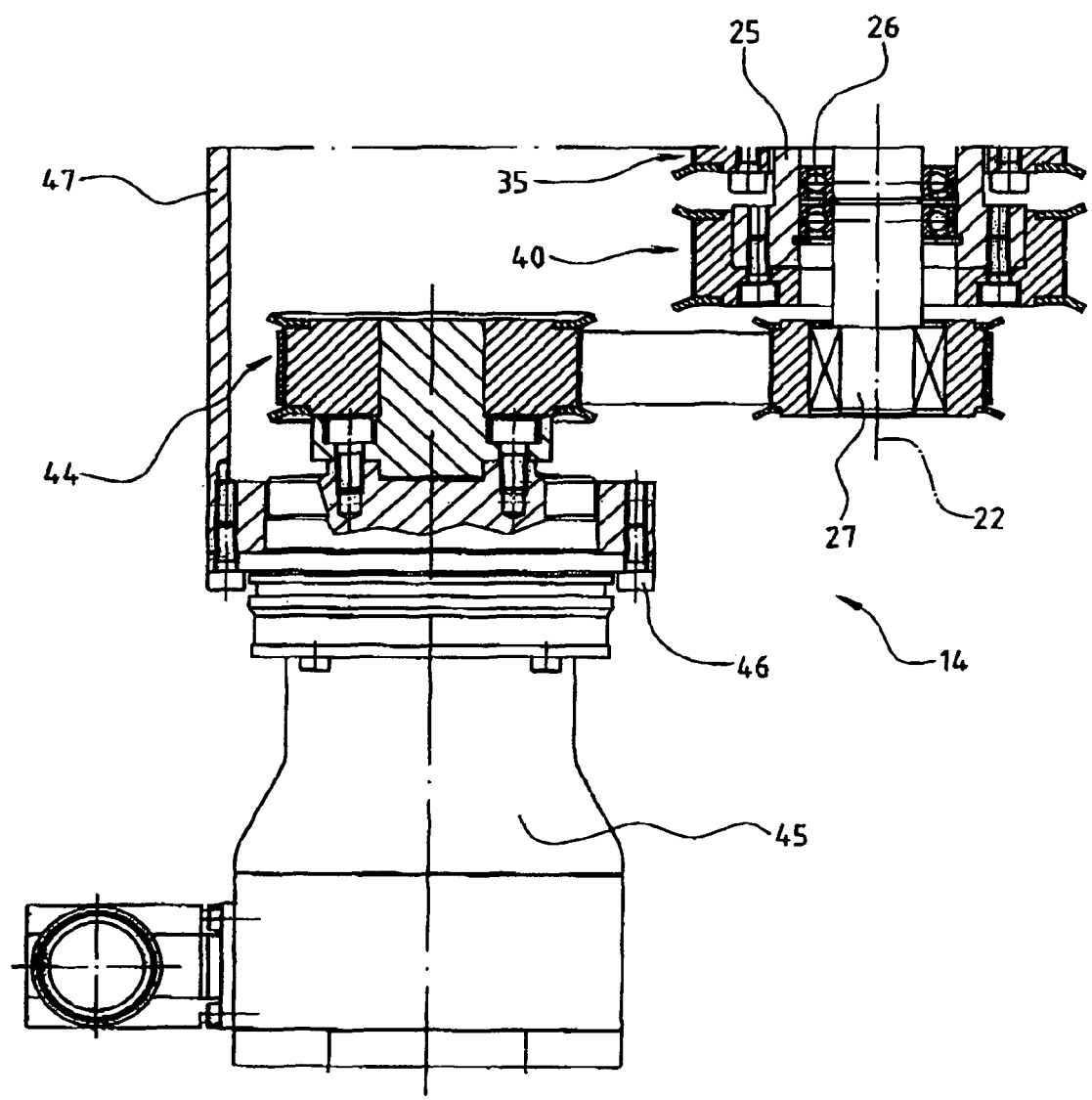
FIG. 3 illustrates the cross-sectional view at line III-III in FIG. 2 on an enlarged scale.

From a combined view of FIGS. 2 to 4 it will be seen that the fourth shaft 27 can be rotatably driven by a third drive unit 45 via a fourth gear mechanism 44 formed as a toothed belt gear mechanism. The third drive unit 45 is attached at the bottom to a third holding device 47 by screws 46. In accordance with FIG. 2 the third holding device 47 is in turn adjustably fixed to the component 15 by screws 32 and associated elongate holes 33.

When in the case of each of the three drive units 29, 41, 45 the tension of the toothed belt of the associated gear mechanism 35, 40, 44 is to be adjusted, the two associated screws 23 are loosened and the associated holding device 31, 43, 47 with respect to the first longitudinal axis 22 is pushed radially outwards until the desired belt tension is achieved. The two screws 32 are then tightened.

In accordance with FIG. 4 a fifth shaft 49 is rotatably mounted inside the second hollow shaft 37 via roller bearings 48. The fifth shaft 49 can be rotatably driven by the fourth shaft 27 via a fifth gear mechanism 50 formed as a toothed belt gear mechanism. By means of the fifth shaft 49 a sixth shaft 52 can be rotatably driven via a sixth gear mechanism 51 formed as a toothed belt gear mechanism. The sixth shaft 52 is mounted in a rotatable manner in a bushing 55 of a crank arm 54 via roller bearings 53. The bushing 55 can be displaced relative to the crank arm 54 in order to adjust the belt tension of the sixth gear mechanism 51 and can be fixed by four screws 56 (FIG. 6) which are in turn received in elongate holes in the crank arm 54. The crank arm 54 is attached to the second hollow shaft 37 via screws 57.

The sixth shaft 52 has a third longitudinal axis 58 in parallel with the longitudinal axes 22, 38.

The tension of the toothed belt of the fifth gear mechanism 50 can be adjusted by releasing four screws 59 (FIG. 6) which connect an upper and a lower part of the housing 28 to each other via elongate holes. The elongate holes extend in the longitudinal direction of the toothed belt. As soon as the belt tension is adjusted by displacing the upper part of the housing 28, the screws 59 are then tightened.

An angular profiled part 60 is screwed to the lower end of the sixth shaft 52, on the vertical limb of which angular profiled part a base part 61 of a push-off unit 62 is fastened by screws 63.

At the top left of FIG. 4 an upper edge 64 of the conveyor belt 5 is indicated with a dot-dash line.

Figure 5:
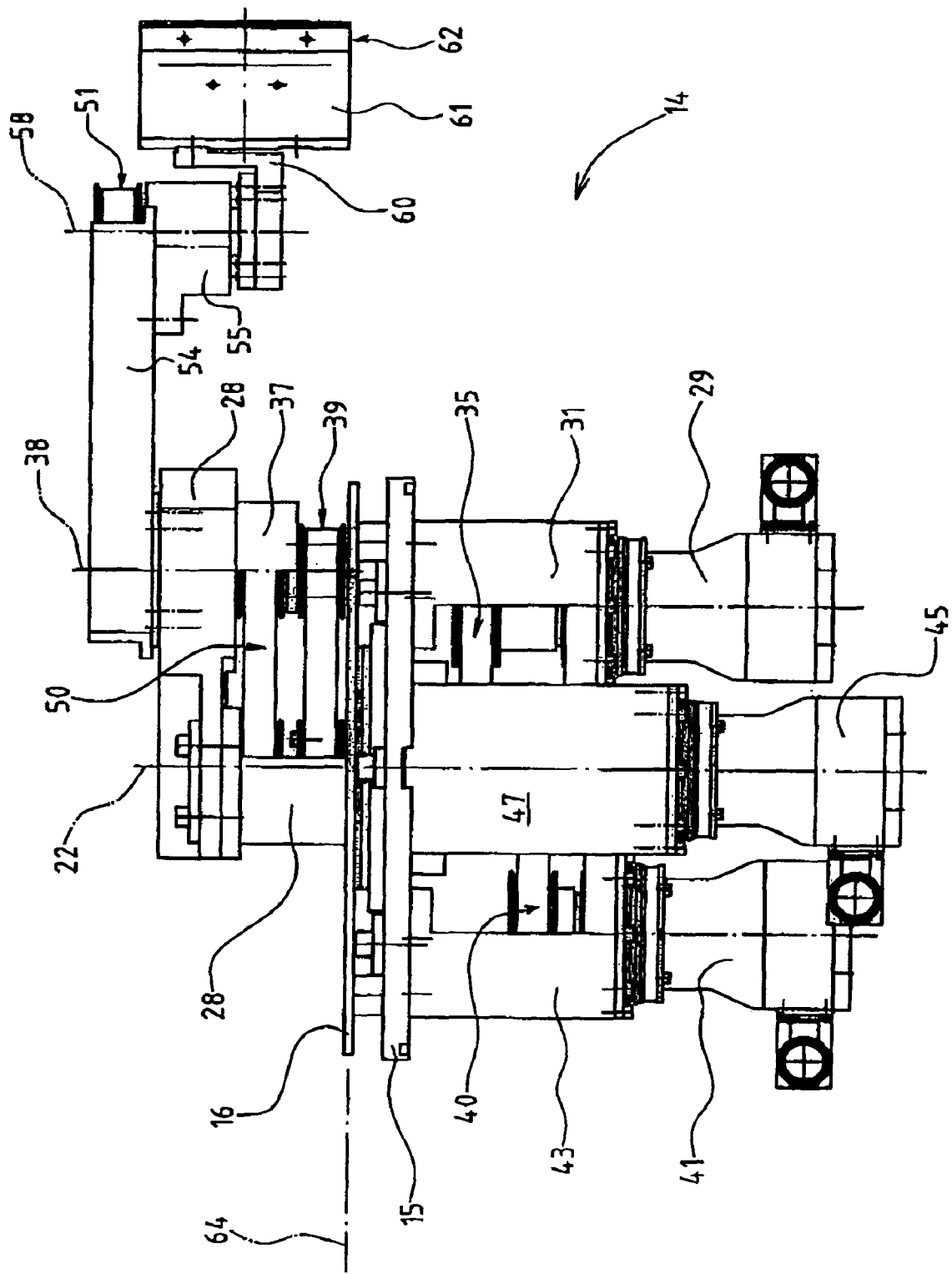
FIG. 5 illustrates the side view at line V-V in FIG. 2.

FIG. 5 shows further details of the device 14 in a side view. The drive units 29 and 41 and their holding devices 31 and 43 are illustrated folded into the plane of the drawing.

The FIGS. 6 to 15 to a certain extent supplement FIG. 2 in the upwards direction, wherein, however, the conveyor belt 5 is no longer disposed at the bottom as in FIG. 2 but at the top.

FIGS. 6 to 15 show that in this case three hollow glass objects 7 are produced simultaneously in the associated section 2 and then set down on the dead plate 1 by a take-out which is known per se but is not illustrated herein. These three hollow glass objects 7 are disposed in a row along the middle line 3 of the dead plate 1. The longitudinal axes of the hollow glass objects 7 are located respectively at the starting point 8.

For each of the three hollow glass objects 7 a pushing finger 65 is mounted on the base part 61. The free end of each pushing finger 65 is slightly curved in the conventional manner towards the associated hollow glass object 7 in order to make it easier to push the hollow glass objects 7 onto the conveyor belt 5.

Figure 6:
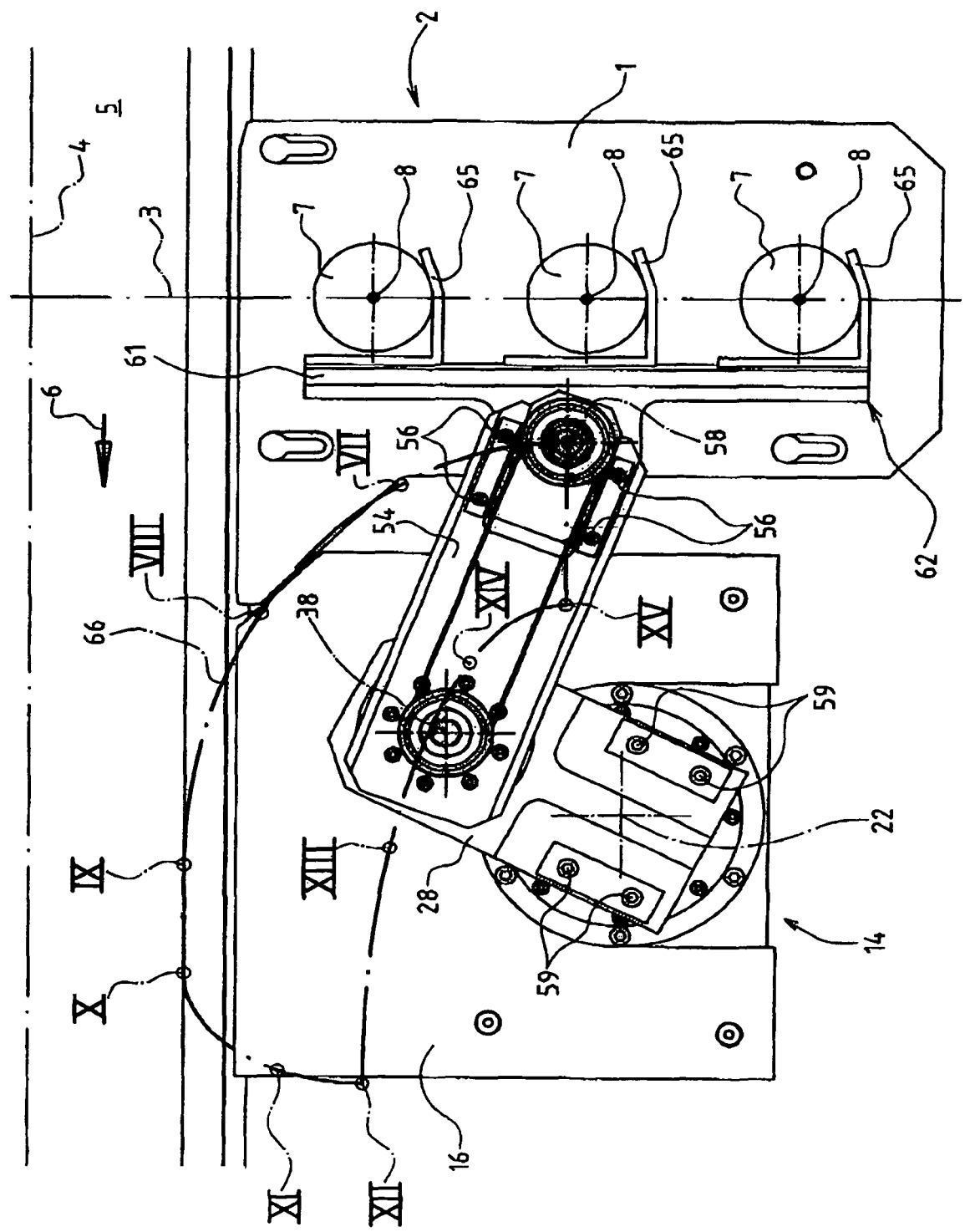
FIG. 6 illustrates substantially the plan view of the device of FIG. 4 with a path curve of the third longitudinal axis of the device and FIGS. 7 to 15 each illustrate views corresponding to FIG. 6 in successive positions VII to XV of the third longitudinal axis along the path curve in accordance with FIG. 6.
Figure 7:
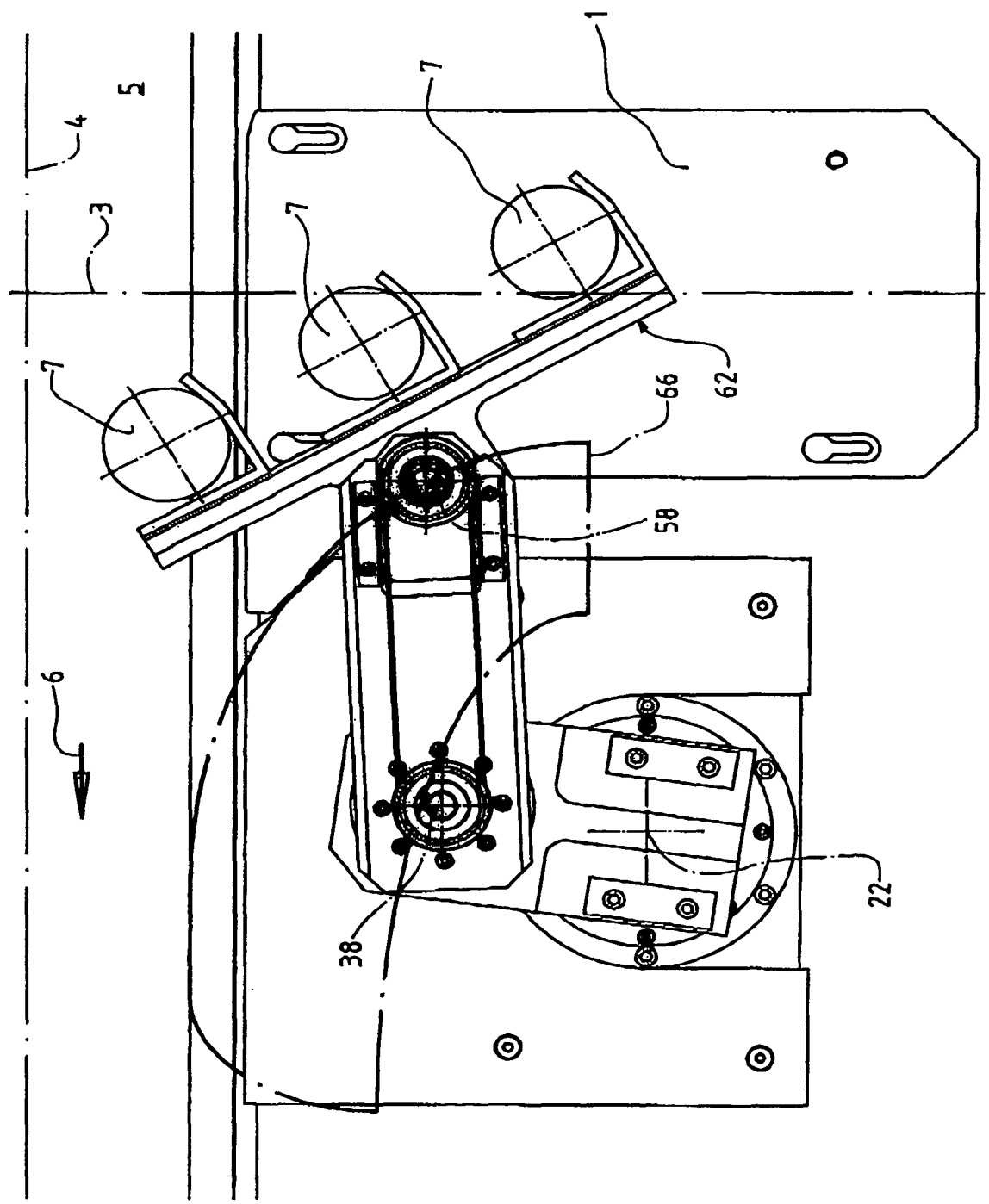
Figure 8:
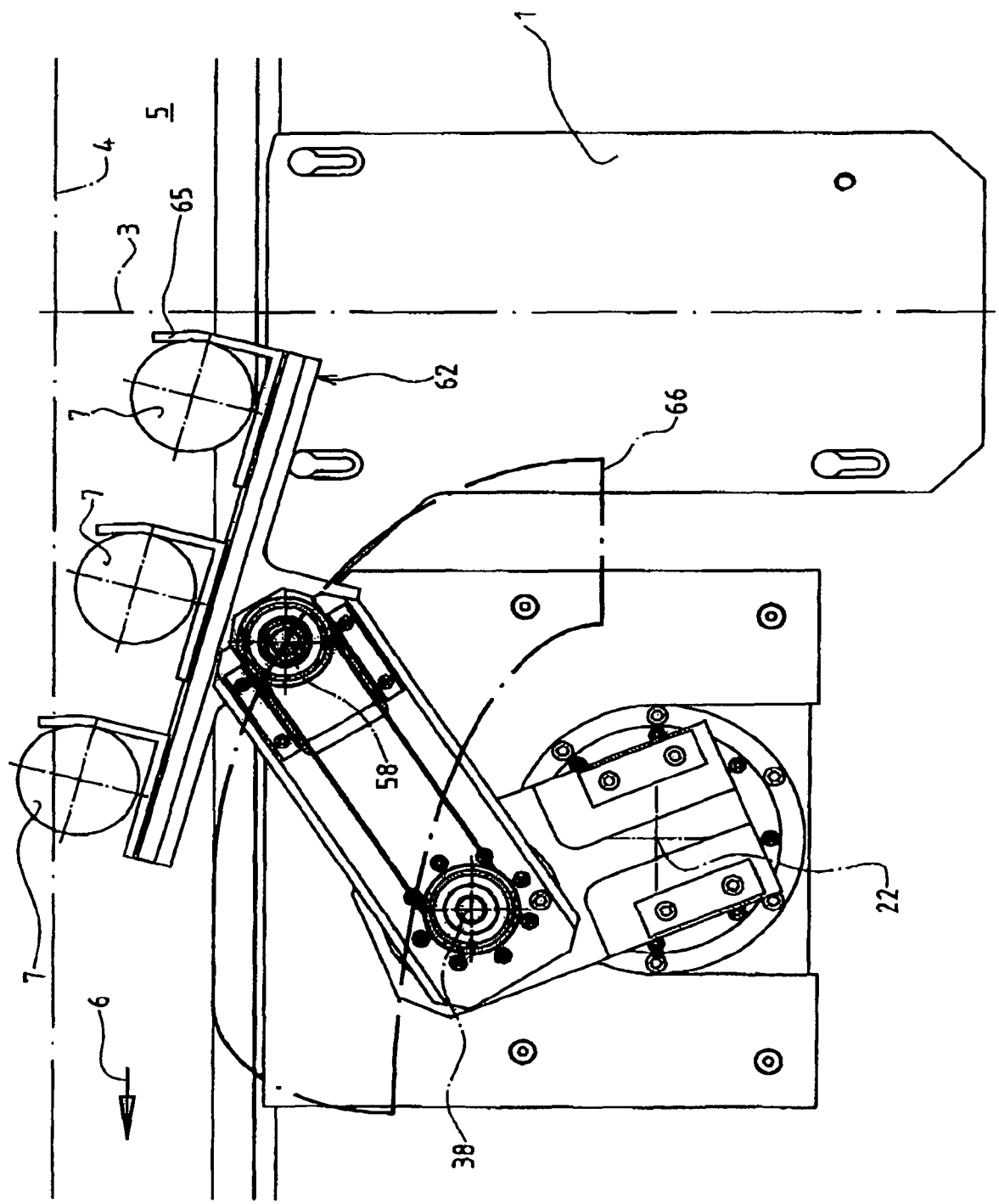
Figure 9:
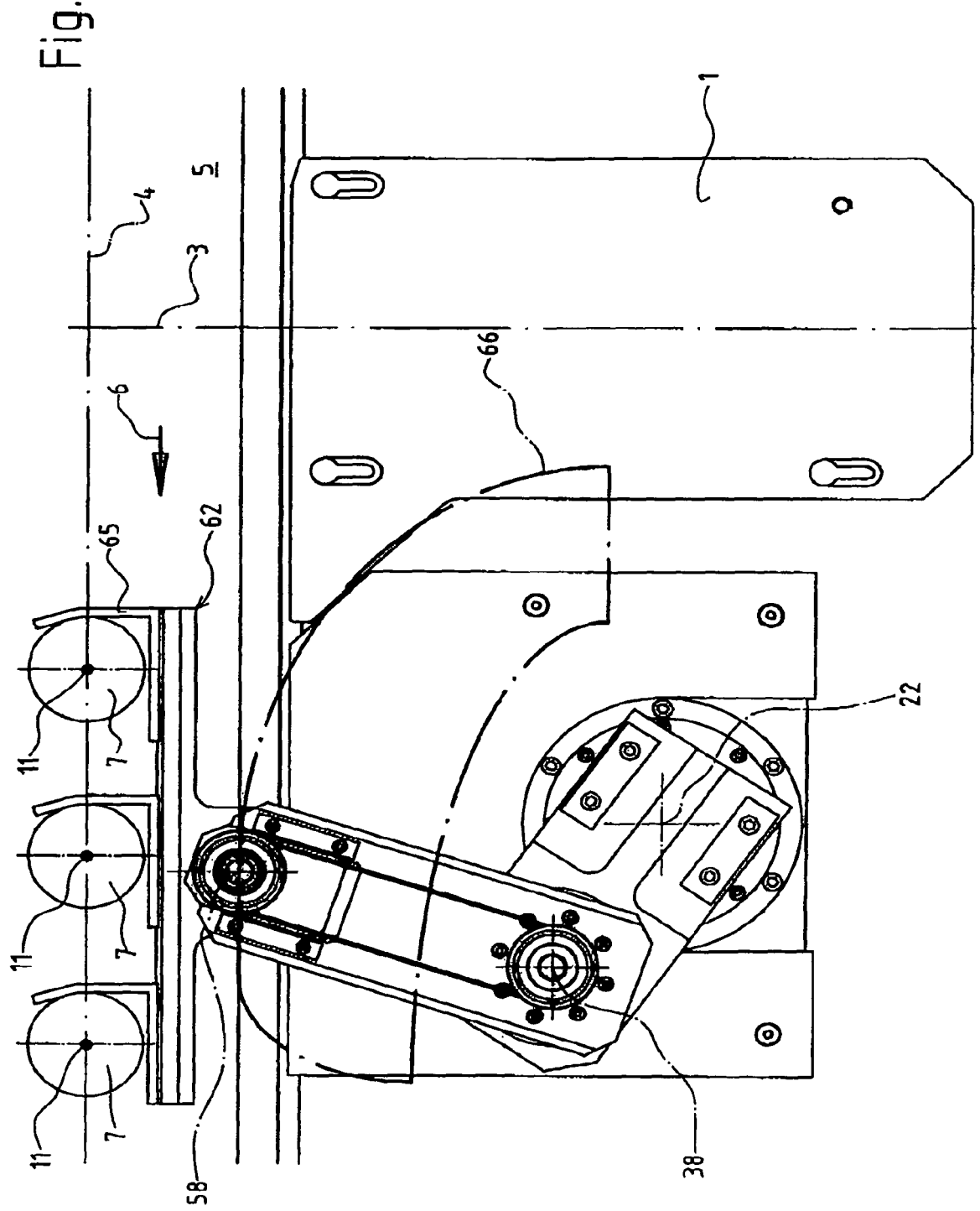
Figure 10:
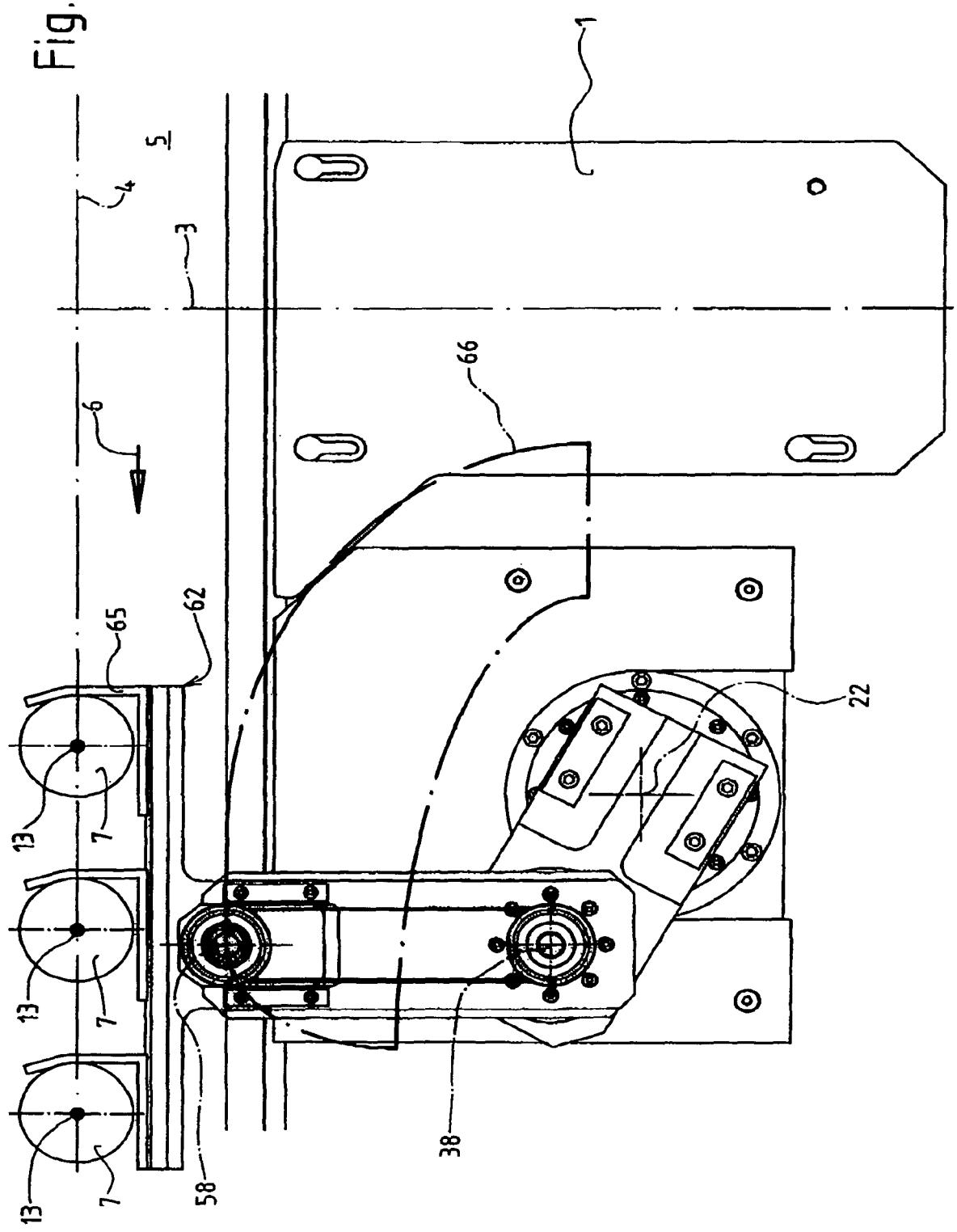
Figure 11:
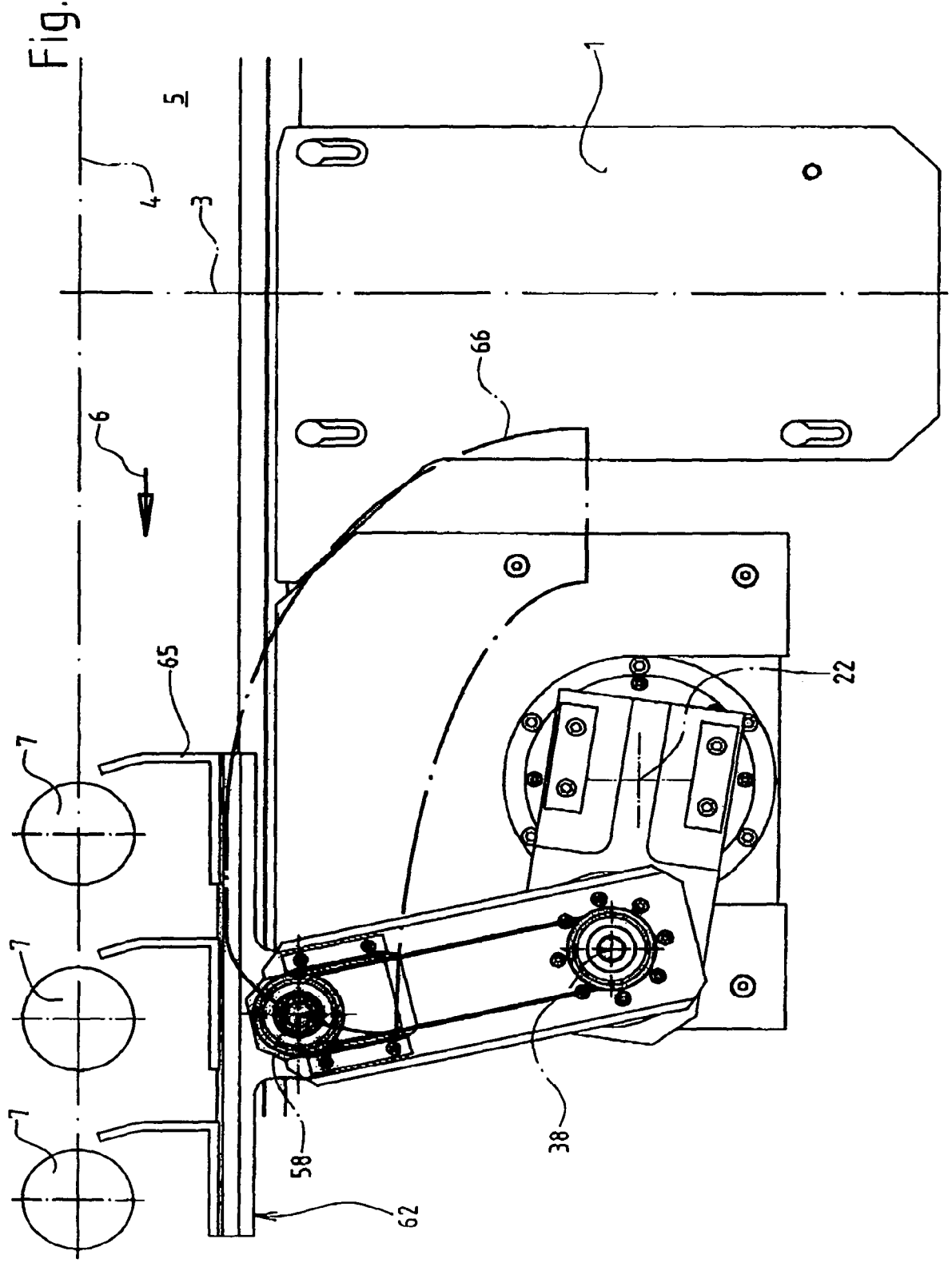
Figure 12:
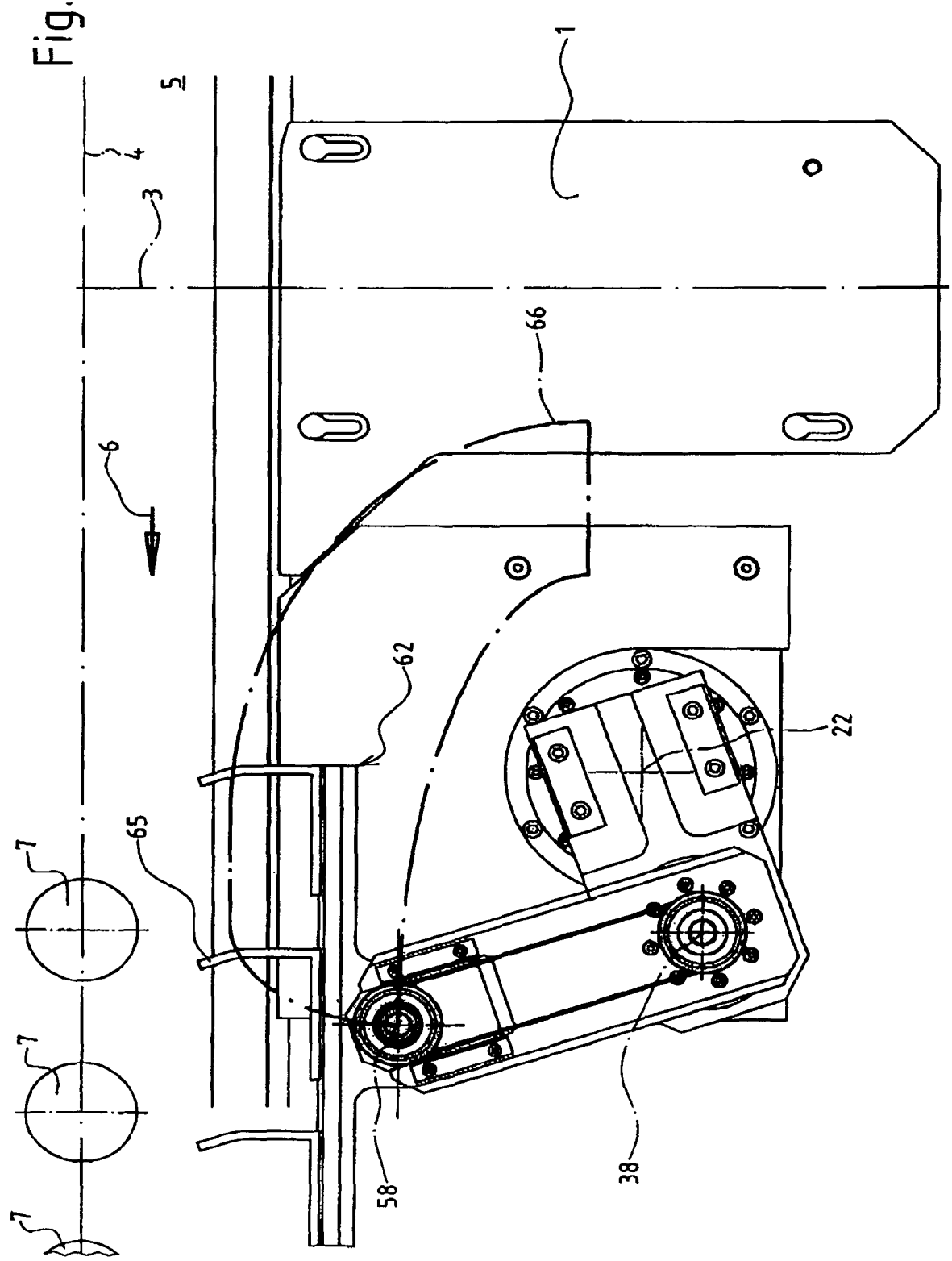
Figure 14:
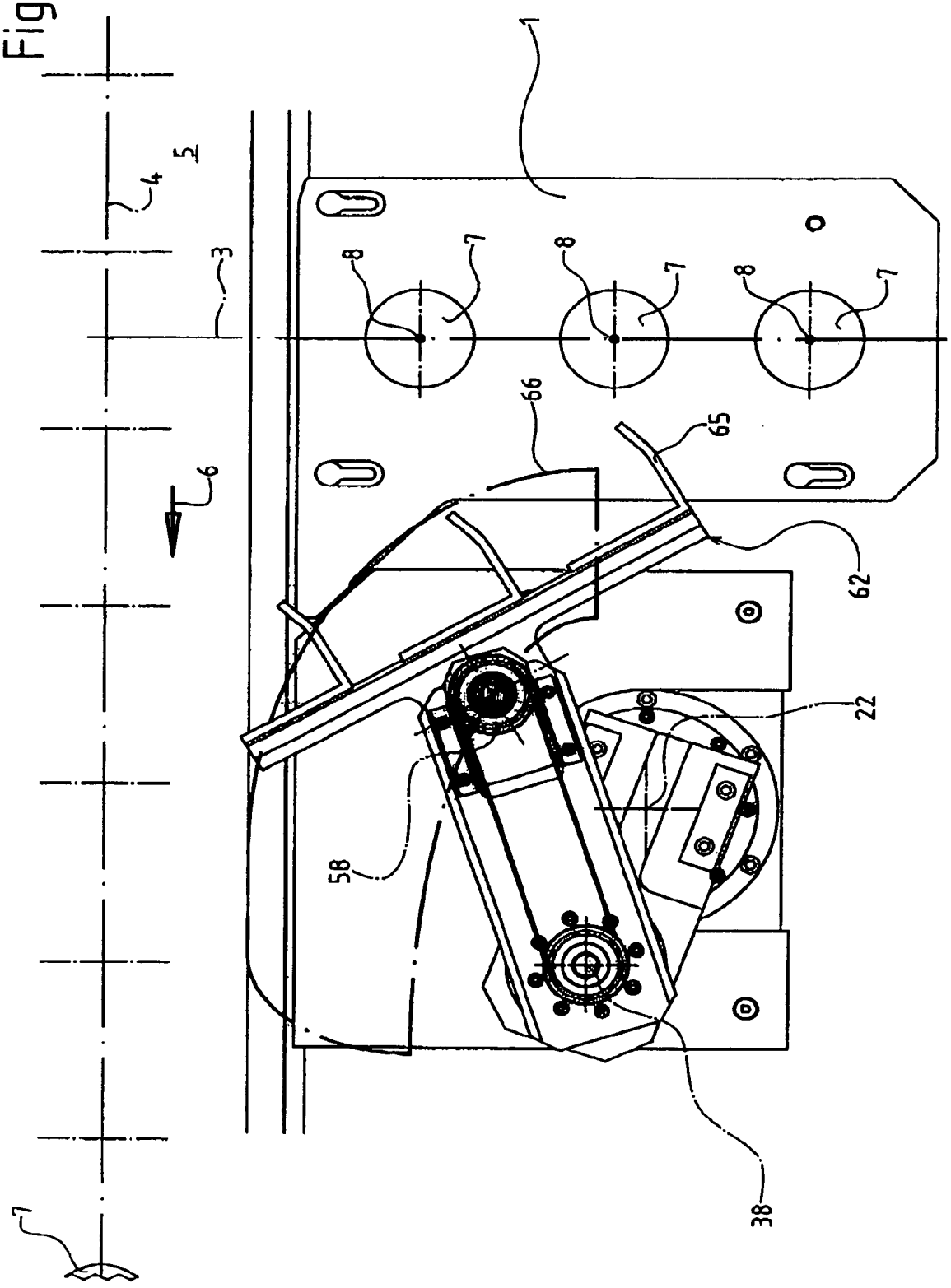
Figure 15:
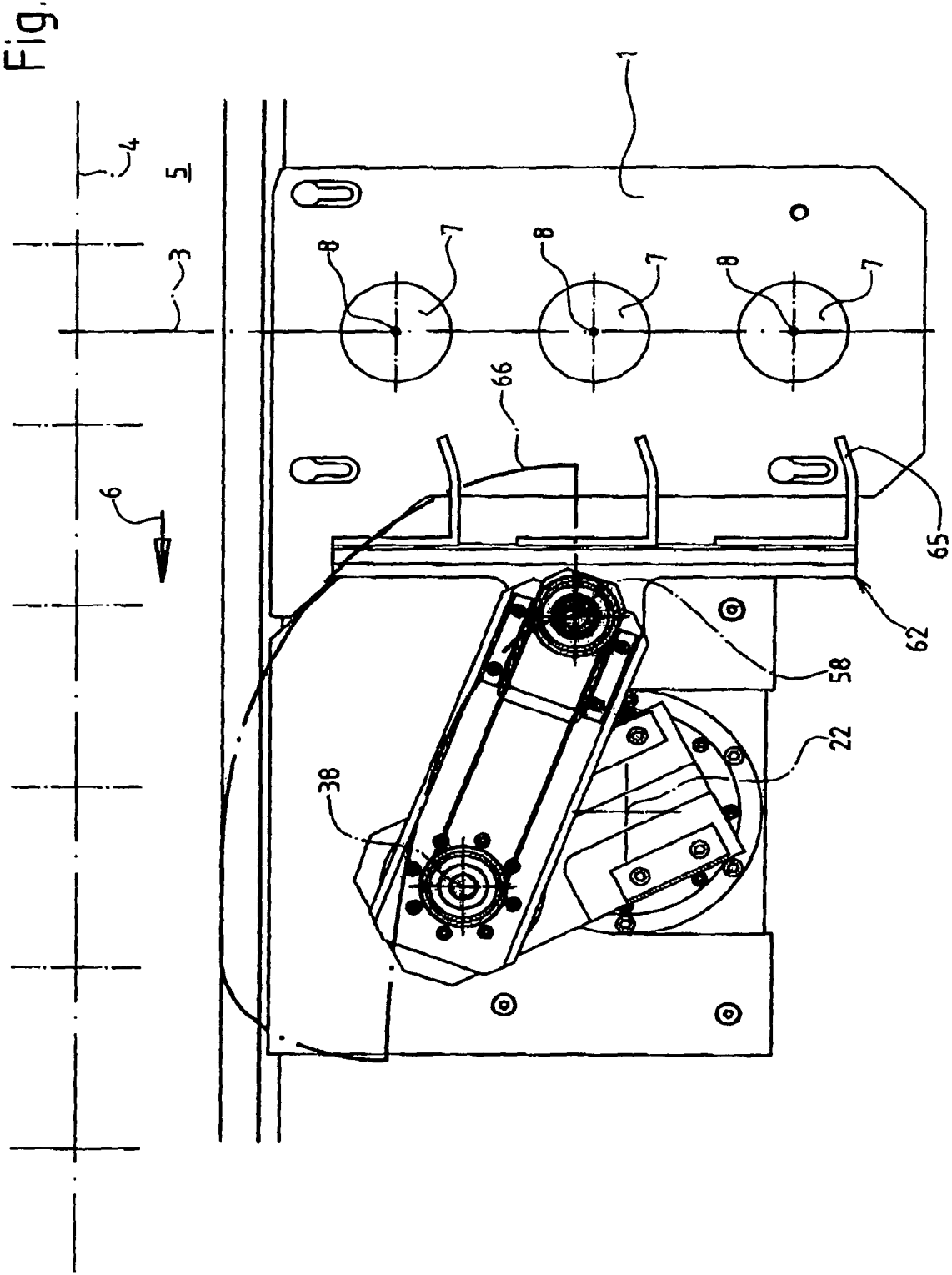

FIG. 6 shows the operating state in which the push-off unit 62 has been moved to the right from its starting position in accordance with FIG. 15 in such a way that the pushing fingers 65 are disposed behind and in contact with the hollow glass objects 7. The operating state illustrated in FIG. 6 is the state at the beginning of the actual push-off action. During this push-off action the longitudinal axis of each hollow glass object 7 should move on a path curve corresponding to the path curve 10 in accordance with FIG. 1. In order to achieve this the third longitudinal axis 58 moves on another path curve 66 in accordance with FIGS. 6 to 15.

On the basis of the operating state in accordance with FIG. 6, FIGS. 7 to 15 each show the relative positions of the housing 28, of the crank arm 54 and of the push-off unit 62 at the points VII to XV of the other path curve 66. The point IX of the other path curve 66 corresponds in each case to the contact point 11 in accordance with FIG. 1 (see FIG. 9) and point X of the other path curve 66 corresponds in each case to the release point 13 in accordance with FIG. 1 (see FIG. 10).

The said relative position of the housing 28, of the crank arm 54 and of the push-off unit 62 is achieved at each point of the other path curve 66 by suitable control of the drive units 29, 41, 45.

By means of this control any desired alternative path curve 10 for the hollow glass objects 7 and correspondingly any alternative movement path for the push-off unit 72 and the hollow glass objects 7 can be imposed. The object in all cases is to push the hollow glass objects 7 in each case from their starting point 8 along the curved path 9 (FIG. 1) in the most protective manner possible as far as the contact point 11 on the conveyor belt 5 and to reduce or even overcome instability which may possibly occur among the hollow glass objects 7 on the curved path 9 by means of continued form-fit pushing of the hollow glass objects 7 along the linear path portion 12. Only once this is satisfactorily achieved are the pushing fingers 65 withdrawn from the row of hollow glass objects 7 on the conveyor belt 5 in accordance with FIG. 11, without a collision occurring with the respective subsequent hollow glass object. All these movements of the push-off unit 62 can be achieved in a very precise and reproducible manner by sensitive control of the drive units 28 and/or 41 and/or 45. Thus for each drive unit 29, 41, 45 a movement profile can be programmed and stored over the operating cycle for each type of hollow glass objects 7. These programs can also be easily changed when the type of hollow glass objects 7 is changed.

In the exemplified embodiment illustrated in FIGS. 6 to 15 for example, the pivot range of the housing 28 about the first longitudinal axis 22 amounts to 360°, the pivot range of the crank arm 54 about the second longitudinal axis 38 amounts to 275° and the pivot range of the push-off unit 62 about the third longitudinal axis 58 amounts to 115°.

Figure 13:
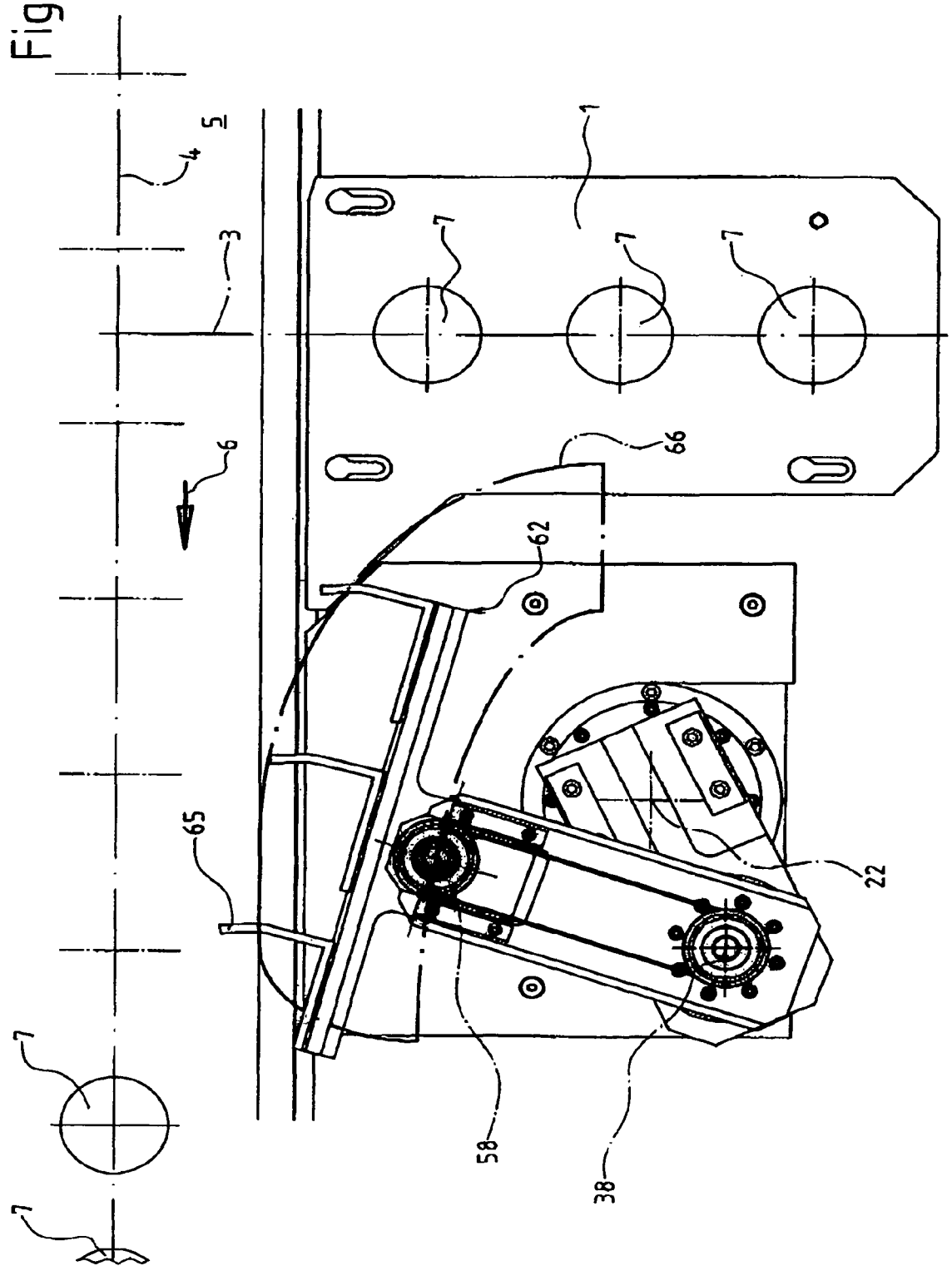

By suitable control of the drive units 29, 41, 45 it is also ensured that the push-off unit 62 during its return from its end pushing position (FIG. 10) into its starting position in accordance with FIG. 15 does not collide with new hollow glass objects 7 which have been set down in the meantime on the dead plate 1 in accordance with FIGS. 13 to 15.

Each drive unit 29, 41, 45 can comprise, for example an electric servo motor possibly with a reducing gear connected downstream.

The invention claimed is:

1. A process for pushing at least one hollow glass object from a dead plate of a glass forming machine onto a moving conveyor belt positioned adjacent to said dead plate, said conveyor belt moving along a line of motion, said process comprising:

providing a push-off unit adjacent to said dead plate and said conveyor belt;

pushing said object with said push-off unit from a starting point on said dead plate to a contact point on said conveyor belt along a curved path, said curved path tangentially intersecting said line of motion at said contact point;

pushing said object with said push-off unit from said contact point to a release point on said conveyor belt along a linear path oriented along said line of motion of said conveyor belt, said push-off unit carrying out said pushing step from said contact point by moving in contact with said object along said linear path oriented along said line of motion of said conveyor belt;

releasing said object from said push-off unit at said release point; and moving said push-off unit to said starting point.

2. The process according to claim 1, further comprising:

pushing a plurality of said objects from said dead plate onto said conveyor belt along said curved and said linear paths, each said object having a respective contact point on said conveyor belt; and aligning said objects on said conveyor belt along said line of motion at said respective contact points.

3. The process of claim 2 further including the step of releasing the plurality of objects simultaneously.

4. The process of claim 2 wherein the push-off unit pushes at least three objects simultaneously.

5. The process of claim 1 wherein said push off unit includes at least one finger which moves in contact with said object from said contact point along said linear path oriented along said line of motion of said conveyor belt.

6. A process for pushing a stationary object onto a conveyor belt moving along a line of motion, said process comprising:

pushing said object along a curved path from a starting point positioned adjacent to said conveyor belt onto a first point on said conveyor belt, said curved path tangentially intersecting said line of motion at said first point; and pushing said object along a linear path from said first point to a second point on said conveyor belt, said linear path oriented along said line of motion of said conveyor belt, this said pushing step being carried out by moving a pusher unit in contact with said object along said linear path between said first and second points on said conveyor belt.

7. A process for pushing at least one hollow glass object from a dead plate of a glass forming machine onto a moving conveyor belt positioned adjacent to said dead plate, said conveyor belt moving along a line of motion, said process comprising:

(i) providing a push-off unit adjacent to said dead plate and said conveyor belt;

(ii) moving said object with said push-off unit along a curved path from a starting point adjacent to said conveyor belt to a contact point on said conveyor belt, said curved path tangentially intersecting said line of motion at said contact point;

(iii) moving said push-off unit in contact with said object from said contact point to a release point on said conveyor belt along a linear path oriented along said line of motion of said conveyor belt to stabilize said object;

(iv) releasing said object from said push-off unit at said release point; and (v) moving said push-off unit to said starting point.

8. The process of claim 7 wherein said push-off unit comprises a finger, said finger being in contact with said object in steps (ii) and (iii).

9. The process of claim 8 wherein said push-off unit comprises multiple fingers which contact multiple objects in steps (ii) and (iii).

* * * * *